May 26, 1959 W. C. BUBNIAK ET AL 2,888,248
ROTARY REGENERATOR SEAL
Filed July 5, 1956 3 Sheets-Sheet 1

INVENTORS
William C. Bubniak &
BY Paul T. Vickers

Paul Fitzpatrick
ATTORNEY

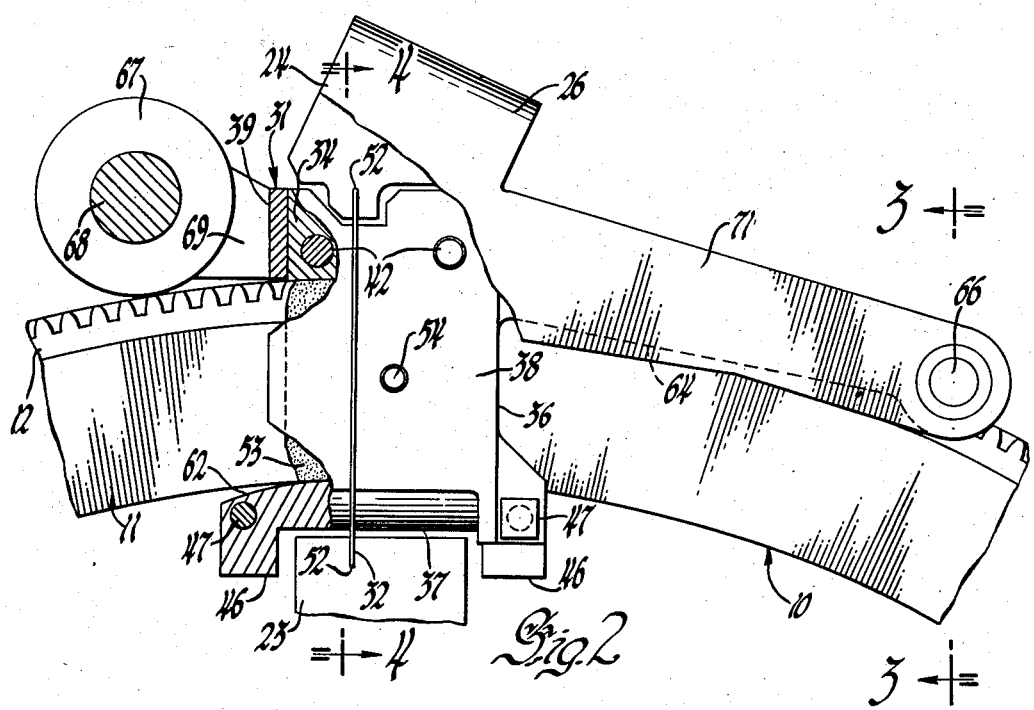
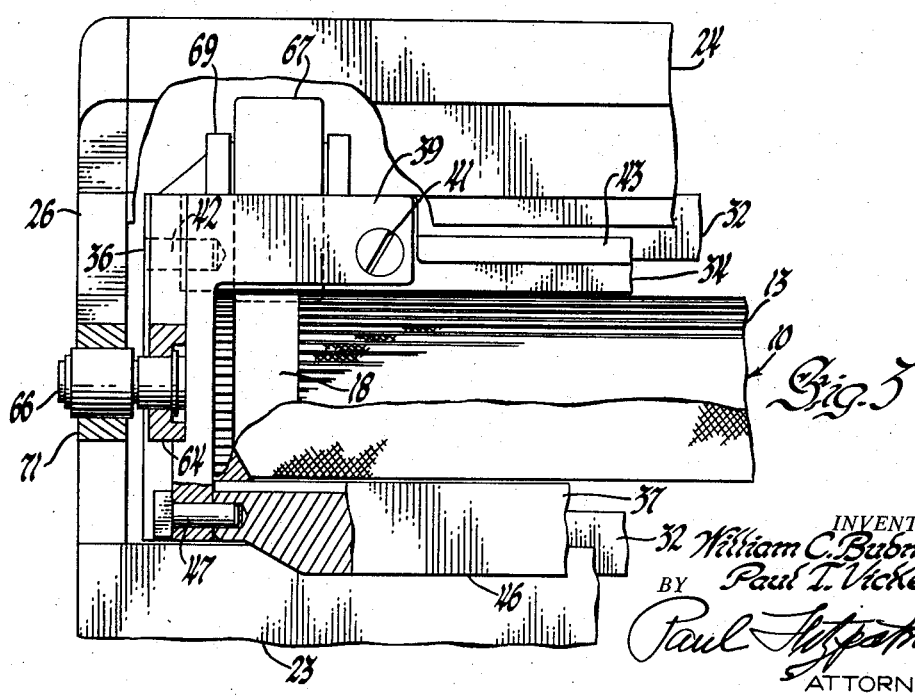

United States Patent Office 2,888,248
Patented May 26, 1959

2,888,248

ROTARY REGENERATOR SEAL

William C. Bubniak, Detroit, and Paul T. Vickers, Royal Oak, Mich., assignors to General Motors Corporation, Detroit, Mich., a corporation of Delaware Application July 5, 1956, Serial No. 595,979

11 Claims. (Cl. 257—6)

Our invention relates to rotary regenerators and particularly to improvements in the main seals of such regenerators, these being the seals through which the matrix passes and which seal off the heat receiving section of the matrix from the heat releasing section.

In many applications of rotary regenerators, such as to gas turbine engines, there is a considerable pressure difference between the gases passing through the two sections and a very serious loss of efficiency results from significant leakage circumferentially of the matrix through the main seal. In a gas turbine engine, compressor discharge air at high pressure flows through the heat releasing section of the matrix and turbine exhaust gases at low pressure flow through the heat receiving section. Leakage of the high pressure air into the exhaust represents a direct loss of energy put into the air by the compressor which otherwise could be usefully employed as power output of the engine.

Some leakage between the stationary seal and the moving regenerator is unavoidable and, in general, the seal must rely upon small clearances between these parts, and may rely to some extent on a labyrinth seal effect created by ribs or grooves on one or the other of the relatively moving surfaces.

The problem is complicated by the unavoidable change in configuration of the matrix between its cold condition when the engine has not been running and its hot condition which it soon reaches in operation of the engine. A matrix which is either in the form of a drum or a disk will ordinarily have a rectangular cross section with two faces and two edges shorter than the faces. In a drum matrix, the faces are the inner and outer surfaces of the annulus, and in a disk matrix they are the side faces of the disk. Because the hot gases flow through the matrix from one face to the other, the face through which the hot gases enter, which we may call the hotter face of the matrix, expands more than the other or cooler face, causing distortion of the matrix from its rectangular cross section. Thus, in a drum matrix in which the hot gases flow radially outwardly, the inner face will expand more than the outer face, resulting in a somewhat spool-shaped configuration of the matrix when hot. A disk matrix will correspondingly be convex on one face and concave on the other.

So far as we are aware, in previous main seals for such regenerators it has been necessary to provide a sufficient opening in the seal to permit free rotation of the matrix (with or without rubbing contact with the seal) in both its hot and cold conditions, so that, as one face of the matrix becomes concave in operation, it increases its clearance from the seal, providing a fairly substantial leakage path. In one installation of which we are aware with a drum matrix approximately eight inches wide, an additional clearance of about two hundredths of an inch is opened between the seal and the center of the surface of the matrix when the matrix is heated.

The present invention is directed to providing a thermal compensating structure for the seal such that the seal surface which cooperates with the cold face of the matrix is caused to distort commensurately to the distortion of the matrix so that there is just sufficient clearance in the non-operating condition and this minimum clearance is maintained when the matrix is heated in operation. The result is a great reduction in leakage through the seal and the ultimate result is improved performance and efficiency of the engine.

The nature of the invention will be clear to those skilled in the art from the succeeding detailed description of the preferred embodiment thereof and the accompanying drawings in which:

Fig. 2 is a side elevation view of the main seal taken on a plane perpendicular to the axis of the matrix;

Fig. 3 is an elevation view at right angles to Fig. 2 taken on the plane indicated by the line 3—3 in Fig. 2;

Figure 1:
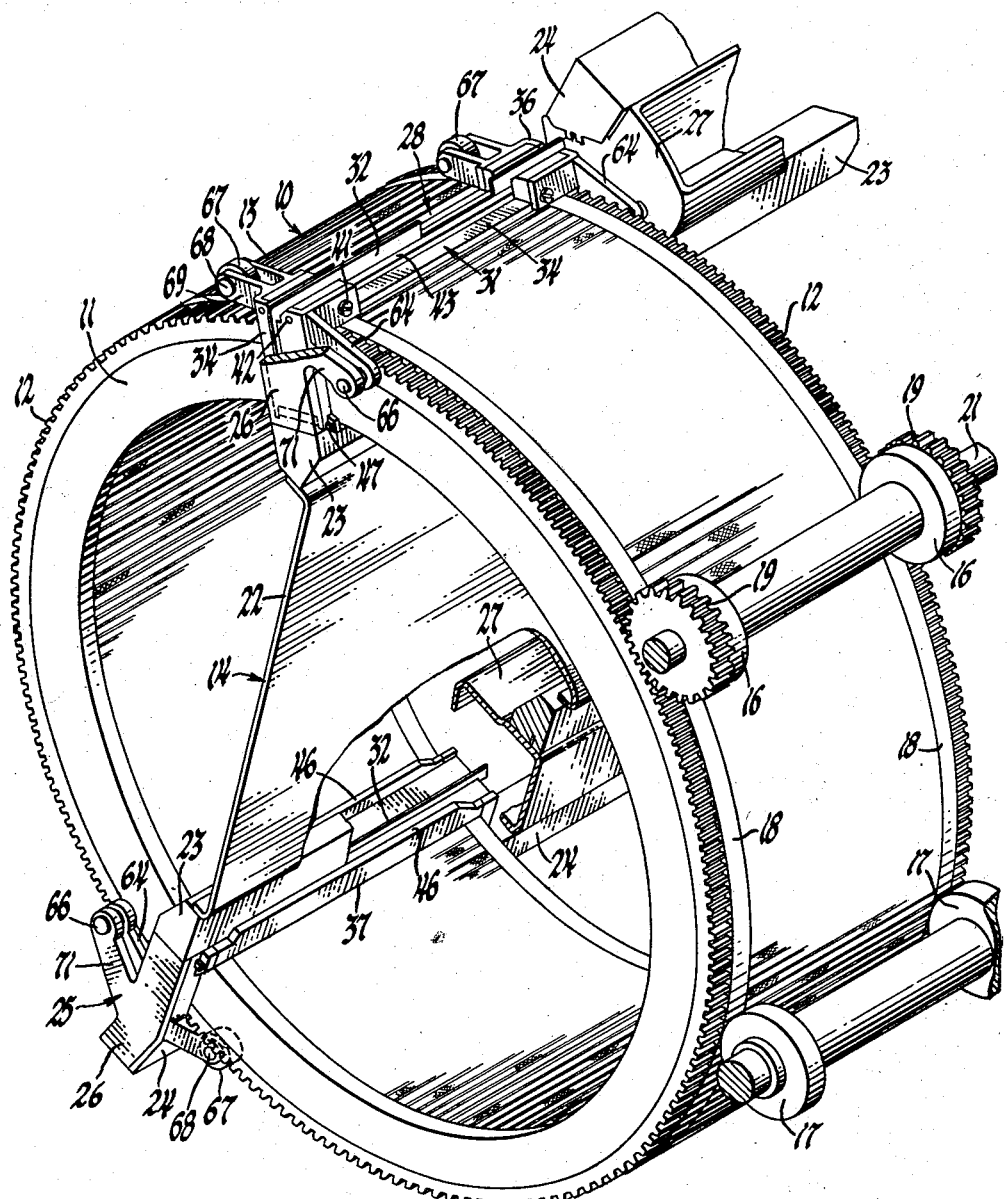
Fig. 1 is an axonometric view of a rotary regenerator from which parts of the assembly immaterial to an understanding of the invention have been omitted.

Before proceeding to a detailed description of the invention, it may be noted that only such parts of the regenerator as need be shown for an understanding of this invention are illustrated in the drawings in the interests of clarity and conciseness. The present invention is an improvement on the rotary regenerator disclosed and claimed in application Serial No. 559,390 for Rotary Regenerator of Bubniak et al., filed January 16, 1956. A power plant including that regenerator is described and claimed in application Serial No. 559,475 for Regenerative Gas Turbine of Amann et al., filed January 16, 1956. These applications show the enclosing, supporting, and rotating structure for the regenerator, the rim seals, and other features which are immaterial to the present invention, and also disclose a preferred installation including the means by which the cool compressed air and hot exhaust gases are distributed to the matrix and caused to flow through it. The regenerator matrix is preferably of the type described and claimed in application Serial No. 559,389 for Regenerative Heat Exchanger of Collman et al., filed January 16, 1956. While the above-mentioned applications contain what may be regarded as background information, we believe that the drawings and description of this application provide a complete explanation of our invention.

Referring first to Fig. 1 for a general description of the regenerator, it comprises an annular matrix 10 in the form of a drum, the edges of the drum being defined by end rings 11 on which are mounted ring gears 12. The heat exchange portion 13 of the matrix extending between the end rings 11 is defined by reticulate or foraminous material, preferably of the type disclosed in the above-mentioned Collman et al. application. A diaphragm or bulkhead assembly, identified generally as 14, through which the matrix passes at two points, divides the matrix into a forward section through which air discharged from a compressor (not shown) flows radially inwardly and a rear section through which exhaust gases discharged from a turbine (not shown) flow radially outwardly. The regenerator housing and other structures by which the air and gas flow is directed are omitted from the drawings. The regenerator is located by upper rollers 16 and lower rollers 17 mounted on shafts fixed in the housing, these rollers bearing against tracks 18 on the periphery of rings 11. The matrix is rotated slowly clockwise by pinions 19 on power driven shaft 21 engaging the ring gears 12.

The diaphragm assembly 14 includes a plate 22, inner beams 23 fixed to and extending across the upper and lower edges of the plate adjacent the matrix, and outer beams 24 extending across the outer face of the matrix. The inner and outer beams are connected by plates 26 at the outer edge of the matrix and by hollow blocks 27 at the inner edge of the matrix so that the parts 23, 24, 26, and 27 provide a frame 25 surrounding the matrix and the main seals. The outer beams 24 may be fixed to the casing of the regenerator (not shown). The connecting plates 26 may be removed for disassembly of the regenerator and its main seals from the engine.

The main seals 28 are disposed in the frame 25. Each main seal comprises a primary seal 31 which is of rectangular form and encloses the matrix closely. The primary seal is supported so as to move to accommodate the changes in diameter in the matrix between its cold and hot conditions resulting from thermal expansion. This movement of the primary seal with respect to the fixed frame 25 is accommodated by a secondary seal 32 which is a rectangular frame of shim stock extending around the primary seal and received in grooves in the primary seal and in the seal frame, the secondary seal bridging the gap between the primary seal and frame 25.

The structure so far described corresponds to that disclosed in the applications referred to above. This application is directed to a new structure of the primary seal by which it accommodates itself to thermal distortion of the matrix. A new means for supporting the primary seal and aligning it with the matrix to accommodate diametrical expansion of the matrix is also described herein.

Each primary seal 31 (see also Figs. 2 to 4) includes a frame comprising four principal parts: an outer seal bar 34 extending across the outer or cooler side of the matrix, a support 36 extending across each edge of the matrix, the supports being right and left handed, and an inner seal bar or shoe 37 extending across the inner or hotter side of the matrix. The body or central portion 38 of the support 36 constitutes an arm extending radially across the edge of the matrix from the outer seal bar and rigidly attached to the bar. Two wings or brackets 39 extend over the matrix from the outer part of the support 36 embracing the end of the outer seal bar 34. The supports 36 are rigidly connected to the outer seal bar 34. A screw 41 extends into the side of the seal bar from the end of each bracket 39. This screw is body-bound in both the bracket and the seal bar. In addition, two closely fitting pins 42 extend from the support into the end of the outer seal bar parallel to the axis of the matrix. The central portion of the seal bar is sufficiently resilient to bow inwardly. A narrow ridge 43 on the outer surface of the outer seal bar provides for the slot in which the secondary seal 32 is mounted. The inner seal bar 37 is of stiffer construction than the outer seal bar, being of channel section except at the ends, with two inwardly extending flanges 46 extending along the edges of the seal bar. Each end of the inner seal bar 37 is located on the support 36 by two square-headed retaining pins 47. The ends of the inner seal bar 37 are in abutting engagement with the interior surfaces of the support 36 at the radially inner ends of arms 38. The pins 47 locate the inner seal bar with respect to the outer seal bar. However, upon expansion of bar 37, the arms 38 may be pushed outwardly or spread apart. The rigid connection between the support and the outer seal bar through the pins 42 and screws 41 causes the outer seal bar to bow or flex inwardly when the supports are spread apart.

Figure 4:
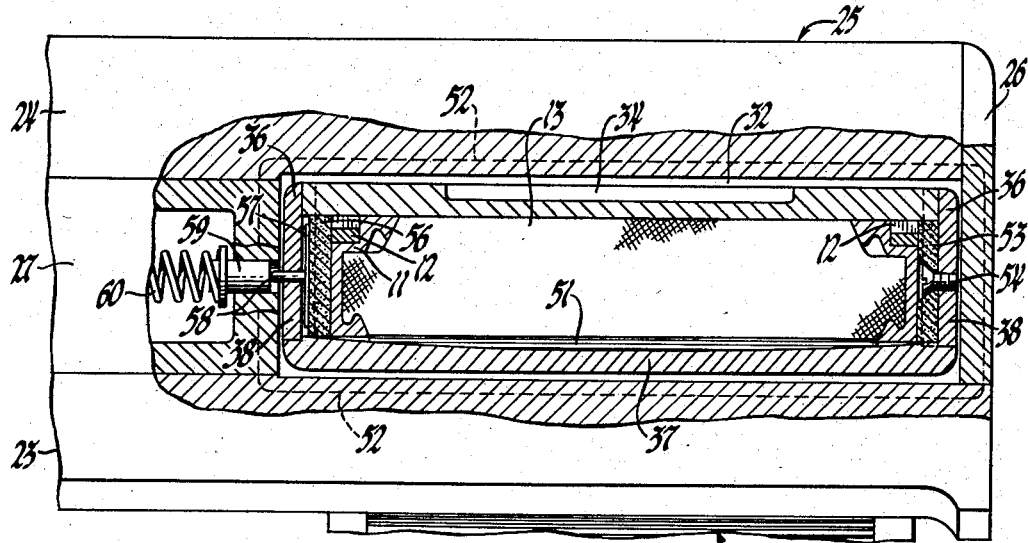
Fig. 4 is a cross-sectional view through the seal and matrix taken on the plane indicated by line 4—4 in Fig. 2 illustrating the relation of the seal and matrix in the cold condition.
Figure 5:
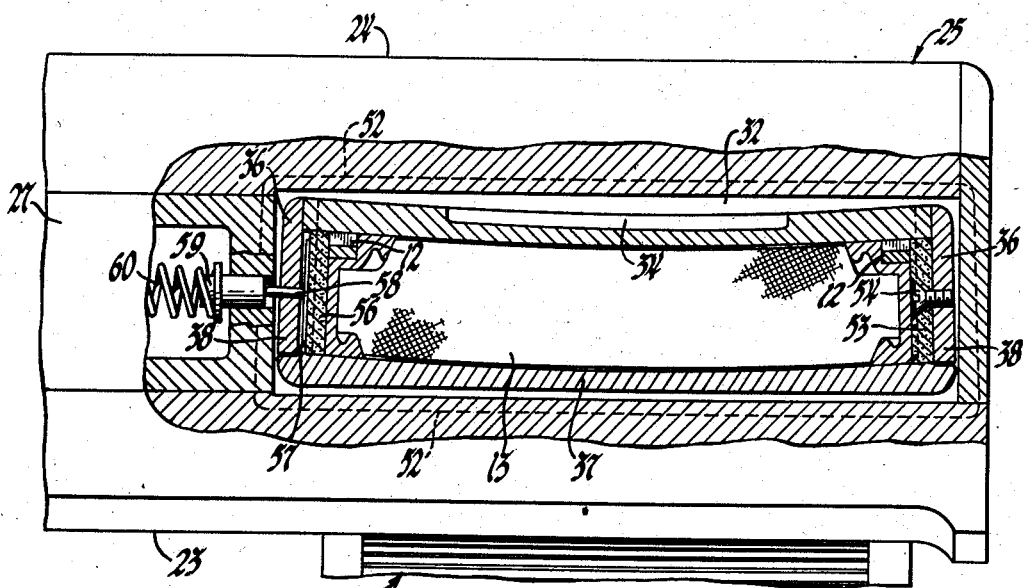
Fig. 5 is a view similar to Fig. 4 illustrating the hot or operating condition of the same.

This action is illustrated in Figs. 4 and 5 in which the curvature of the parts is greatly exaggerated for clarity of illustration. Fig. 4 illustrates the condition of the engine when cold. The cross-section of the matrix is rectangular. The inner surface of the outer seal bar is straight and very slightly spaced from the outer surface of the matrix. The outer surface 51 of the inner seal bar is concave so that in the center of the matrix it is substantially spaced from the matrix by an amount which will be taken up by the curvature of the matrix when it is heated. The actual concavity of the surface 51 is slight. In a particular example, it is of the order of two hundredths of an inch. While the gap between the matrix and the lower seal bar permits leakage when the engine is started, this condition is transitory.

Fig. 5 illustrates the bowing of the matrix into a generally spool shape when the regenerator is heated because of the greater expansion of the relatively hot inner part of the matrix as compared with the outer part. There is, of course, a gradual temperature gradient across the matrix but the total temperature difference between the faces may be about 800° F. When the regenerator is hot, the inner seal bar 37, being hotter than the outer seal bar because it is surrounded by hotter air and gas and because of its close approach to the hotter surface of the matrix, expands more than the outer seal bar 34. In so doing, it pushes the supports 36 apart and a force is thus put on the outer seal bar to cause it to bow inwardly to a contour conforming to the concave contour of the outer surface of the matrix.

The outline of the slot in the seal frame 25 in which the secondary seal 32 is mounted is indicated in broken lines in Figs. 4 and 5 at 52. Figs. 4 and 5 also illustrate the edge seals which prevent flow of gas through the primary seal along the edge of the matrix. The outer edge seal is a graphite block 53 fixed to the inner surface of the arm 38 of the outer support 36 by a countersunk screw 54. The inner edge seal is a graphite block 56 which is floatingly mounted in the seal so that it can be urged by a spring against the edge of the matrix to accommodate expansion in width of the matrix. This block is retained in a recess between radially extending flanges at each edge of the arm 38 and is urged forwardly by a plate 57 from which a pin 58 extends through a small hole in the inner support arm 38. The end of pin 58 is engaged by a plunger 59 extending through the wall of block 27 urged by a compression spring 60 the other end of which is lodged against a suitable abutment. In the installation described in Serial No. 559,475 there are two coaxial regenerators, the block 27 being disposed between the two regenerators. The spring 60 is mounted between plungers 59 at both ends.

It may be noted that the inner surface of the outer seal bar as viewed in Fig. 2 is slightly concave to follow the cylindrical curvature of the drum 10 and the outer surface portion of the inner seal bar which seals against the inner surface of the drum is convex for the same reason. The outer surface at each side of the inner seal bar is provided with a gradually increasing clearance from the matrix as indicated at 62 in Fig. 2. Preferably, the inner seal bar 37 is of cast iron and the outer seal bar 34 and the supports 36 of steel. Cast iron has desirable properties if there should be rubbing between the bar and matrix, but lacks the desired resilience for the outer seal bar.

In explanation of the term "elastic," as used herein with reference to the seal bar which is bowed toward the matrix (outer seal bar 34 as illustrated), it may be pointed out that this term is used in its engineering sense. The seal bar is elastic, since it deforms in proportion to the force applied to it, and returns to its initial form when the force is removed. The seal bar 34 is quite stiff in fact, and the deformation is very slight; but the deformation is an elastic one.

Proceeding now to the means for supporting and locating the primary seal, this is accomplished by arms 64 (Fig. 1) integral with the supports 36 rotatable on trunnions 66 mounted in the fixed regenerator structure and rollers 67 rotatable on shafts 68 extending between clevis arms 69 also integral with the supports and extending from the side thereof opposite to arms 64. The inner trunnion arm 64 is rotatable on a trunnion 66 mounted in the center block 27 and the outer arm 64 on a trunnion 66 mounted in an extension 71 of the plate 26. The rollers 67 ride on the tracks 18 of the matrix end rings. The center lines of the trunnions 66 are located on a line perpendicular to the plane of the secondary seal 32 and passing through the center of pressure of the main seal. Thus, pressure forces acting on the seal do not tend to energize it either radially inward or outward into rubbing engagement with the matrix. The primary seal is urged inwardly by compression springs (not shown) mounted between the beam 24 and the outer ends of the outer seal bar 34 which urge the seal radially inwardly of the matrix with a predetermined force to hold the rollers 67 in engagement with the track. The trunnion mounting of the seals permits them to move inwardly and outwardly to the small extent necessary to accommodate relative diametric expansion and contraction of the matrix with respect to the housing in which it is mounted.

It should be understood, however, that the improved thermal compensating seal may be employed independently of the particular primary seal locating means disclosed herein. It may, for example, be employed with the type of seal support shown in the applications previously referred to, in which the primary seal is located radially with respect to the matrix by four rollers carried by the primary seal, two at each edge of the matrix, bearing on each track 18 (there being two rollers at each side of the primary seal), and is located circumferentially of the matrix by a trunnion extending from each end of the seal into slots in plate 26 and block 27 extending radially of the matrix.

It will be apparent to those skilled in the art from the foregoing description that the thermal compensating seal of the invention is highly advantageous in reducing leakage in rotary regenerators and thereby increasing the efficiency of machines in which they are employed. The simplicity of structure of the thermal compensating seal is a particular advantage.

The detailed description of the preferred embodiment for the purpose of explaining the principles thereof is not to be construed as limiting or restricting the invention, as many modifications may be made by the exercise of skill in the art within the principles of the invention.

We claim:

1. A rotary regenerator comprising, in combination, an annular rotatable matrix substantially rectangular in cross section and bounded by two opposite faces and two edges, one face being hotter than the other face in operation of the regenerator, causing distortion of the matrix such that the colder face is distorted concavely and the hotter face is distorted convexly, and a primary seal extending around the matrix in close juxtaposition to the faces and edges thereof and adapted to inhibit fluid flow circumferentially of the matrix through the seal; the seal comprising a stiff elastic first seal bar extending across the colder face of the matrix, arms rigid on the bar extending across the edges of the matrix, and a rigid second seal bar extending across the hotter face of the matrix and connected to the arms, differential thermal expansion of the second bar relative to the first bar when the regenerator is in operation spreading the arms and bowing the first bar toward the matrix; the face of the second bar confronting the matrix having clearance therefrom in the cold condition corresponding to the convex distortion of the hot face in operation.

2. A rotary regenerator comprising, in combination, an annular rotatable matrix substantially rectangular in cross section and bounded by two opposite faces and two edges, one face being hotter than the other face in operation of the regenerator, causing distortion of the matrix such that the colder face is distorted concavely and the hotter face is distorted convexly, and a primary seal extending around the matrix in close juxtaposition to the faces and edges thereof and adapted to inhibit fluid flow circumferentially of the matrix through the seal; the seal comprising a stiff elastic first seal bar extending across the colder face of the matrix, arms rigid on the bar extending across the edges of the matrix, and a rigid second seal bar extending across the hotter face of the matrix and connected to the arms, differential thermal expansion of the second bar relative to the first bar when the regenerator is in operation spreading the arms and bowing the first bar toward the matrix.

3. A rotary regenerator comprising, in combination, an annular rotatable matrix substantially rectangular in cross section and bounded by two opposite faces and two edges, one face being hotter than the other face in operation of the regenerator, causing distortion of the matrix such that the colder face is distorted concavely and the hotter face is distorted convexly, and a primary seal extending around the matrix in close juxtaposition to the faces and edges thereof and adapted to inhibit fluid flow circumferentially of the matrix through the seal; the seal comprising a stiff elastic first seal bar extending across the colder face of the matrix, arms rigid on the bar extending across the edges of the matrix, and a rigid second seal bar extending across the hotter face of the matrix between the arms, bearing against the inner surface of the arms, and loosely coupled to the arms, differential thermal expansion of the second bar relative to the first bar when the regenerator is in operation spreading the arms and bowing the first bar toward the matrix.

4. A rotary regenerator comprising, in combination, an annular rotatable matrix substantially rectangular in cross section and bounded by two opposite faces and two edges, one face being hotter than the other face in operation of the regenerator, causing distortion of the matrix such that the colder face is distorted concavely and the hotter face is distorted convexly, a primary seal extending around the matrix in close juxtaposition to the faces and edges thereof and adapted to inhibit fluid flow circumferentially of the matrix through the seal; the seal comprising a stiff elastic first seal bar extending across the colder face of the matrix, arms connected to the bar extending across the edges of the matrix, and a rigid second seal bar extending across the hotter face of the matrix and connected to the arms, the face of the second bar confronting the matrix having clearance therefrom in the cold condition corresponding to the convex distortion of the hot face in operation; and means responsive to heating of the primary seal for bowing the first bar toward the matrix.

5. A main seal for a rotary regenerator matrix having faces cooperating with the seal, one face distorting away from the seal and the other face distorting toward the seal when the matrix is heated, the seal comprising, in combination, a stiff elastic first seal bar having a sealing face conforming to the said one face of the matrix when the bar and matrix are cold, a rigid second seal bar having a sealing face conforming to the said other face of the matrix when the bar and matrix are hot, and means responsive to temperature of the seal for distorting the first seal bar to conform to the distorted condition of the said one face of the matrix when the matrix and bars are heated.

6. A main seal for a rotary regenerator matrix having faces cooperating with the seal, one face distorting away from the seal and the other face distorting toward the seal when the matrix is heated, the seal comprising, in combination, a stiff elastic first seal bar having a sealing face conforming to the said one face of the matrix when the bar and matrix are cold, a rigid second seal bar having a sealing face conforming to the said other face of the matrix when the bar and matrix are hot, and means responsive to differential thermal expansion of the seal bars for distorting the first seal bar to conform to the distorted condition of the said one face of the matrix when the matrix and bars are heated.

7. A main seal for a rotary regenerator matrix having faces cooperating with the seal, one face distorting away from the seal and the other face distorting toward the seal when the matrix is heated, the seal comprising, in combination, a stiff elastic first seal bar having a sealing face conforming to the said one face of the matrix when the bar and matrix are cold, a rigid second seal bar having a sealing face conforming to the said other face of the matrix when the bar and matrix are hot, and means responsive to differential thermal expansion of the seal bars for distorting the first seal bar to conform to the distorted condition of the said one face of the matrix when the matrix and bars are heated comprising arms rigid on the first seal bar and engaging the ends of the second seal bar.

8. A main seal for a rotary regenerator matrix having faces cooperating with the seal, one face distorting away from the seal and the other face distorting toward the seal when the matrix is heated, the seal comprising, in combination, a stiff elastic first seal bar having a sealing face conforming to the said one face of the matrix when the bar and matrix are cold, a rigid second seal bar having a sealing face conforming to the said other face of the matrix when the bar and matrix are hot, and means responsive to the temperatures of the seal bars for disorting the first seal bar to conform to the distorted condition of the said one face of the matrix when the matrix and bars are heated.

9. A main seal for a rotary regenerator matrix having faces cooperating with the seal, one face distorting away from the seal and the other face distorting toward the seal when the matrix is heated, the seal comprising, in combination, a first integral elastic seal bar having a sealing face extending across and conforming to the said one face of the matrix when the bar and matrix are cold, a second rigid seal bar having a sealing face extending across and conforming to the said other face of the matrix when the bar and matrix are hot, and means responsive to temperature of the seal for distorting the first seal bar to conform to the distorted condition of the said one face face of the matrix when the matrix and bars are heated.

10. A main seal for a rotary regenerator matrix having faces cooperating with the seal, one face distorting away from the seal and the other face distorting toward the seal when the matrix is heated, the seal comprising, in combination, a first integral elastic seal bar having a sealing face extending across and conforming to the said one face of the matrix when the bar and matrix are cold, a second rigid seal bar having a sealing face extending across and conforming to the said other face of the matrix when the bar and matrix are hot, and means responsive to differential expansion of the seal bars for distorting the first seal bar to conform to the distorted condition of the said one face of the matrix when the matrix and bars are heated.

11. A main seal as recited in claim 10 in which the last-named means includes arms rigid on the first seal bar engaging the second seal bar so as to be spread apart by expansion of the second seal bar.

References Cited in the file of this patent

UNITED STATES PATENTS 2,747,843   Cox ------------------ May 29, 1956